(12) United States Patent
Tanaka

(10) Patent No.: US 9,098,628 B2
(45) Date of Patent: Aug. 4, 2015

(54) MEMORY SYSTEM WITH MULTIPLE BLOCK WRITE CONTROL TO CONTROL STATE DATA

(75) Inventor: Masahiro Tanaka, Shiga (JP)

(73) Assignee: International Business Machines Corporation, Armonk, NY (US)

(*) Notice: Subject to any disclaimer, the term of this patent is extended or adjusted under 35 U.S.C. 154(b) by 429 days.

(21) Appl. No.: 13/559,414

(22) Filed: Jul. 26, 2012

(65) Prior Publication Data

US 2014/0032859 A1    Jan. 30, 2014

(51) Int. Cl.
  *G06F 11/36* (2006.01)
  *H04N 19/93* (2014.01)
(52) U.S. Cl.
  CPC ........ *G06F 11/3648* (2013.01); *G06F 11/3636* (2013.01); *H04N 19/93* (2014.11)
(58) Field of Classification Search
  CPC .......................... G06F 11/3648; G06F 11/3646
  USPC ............................................. 711/154; 714/45
  See application file for complete search history.

(56) References Cited

U.S. PATENT DOCUMENTS

| 6,687,811 B1 * | 2/2004 | Yamada ......................... 712/227 |
| 6,961,875 B2 * | 11/2005 | Floyd et al. ...................... 714/39 |

FOREIGN PATENT DOCUMENTS

| JP | 05035943 | 2/1993 |
| JP | 05165675 | 7/1993 |
| JP | 07098668 | 4/1995 |
| JP | 07281929 | 10/1995 |
| JP | 08286951 | 11/1996 |
| JP | 09026918 | 1/1997 |
| JP | 2636107 | 4/1997 |
| JP | 2000276896 | 10/2000 |
| JP | 2000339189 | 12/2000 |
| JP | 2001175509 | 6/2001 |
| JP | 2002073407 | 3/2002 |
| JP | 3491379 | 11/2003 |
| JP | 2006018705 | 1/2006 |
| JP | 2007206912 | 8/2007 |
| JP | 4413306 | 11/2009 |

\* cited by examiner

*Primary Examiner* — Mardochee Chery
(74) *Attorney, Agent, or Firm* — Kunzler Law Group

(57) ABSTRACT

An apparatus includes a memory module with a plurality of memory blocks and an address decoder module that decodes one or more address lines of the plurality of memory blocks. An address output of the address decoder module corresponds to each memory block. A BWE module includes a block write enable ("BWE") signal corresponding to each memory block. Each BWE signal has a block write enable state and a block write disable state. In response to receiving a block write enable control ("BWEC") signal in a normal use mode, a MUX module passes a corresponding address output of the address decoder module to a write enable input of each memory block. In response to receiving the BWEC signal in a state trace mode, the MUX module passes a corresponding BWE signal to the write enable input of each memory block.

22 Claims, 9 Drawing Sheets

| BWEC | BWE0 | BWE1 | BWE2 | BWE3 | A0 | A1 | BWEN0 | BWEN1 | BWEN2 | BWEN3 |
|---|---|---|---|---|---|---|---|---|---|---|
| L | * | * | * | * | * | * | BWE0 | BWE1 | BWE2 | BWE3 |
| H | * | * | * | * | L | L | L | H | H | H |
| H | * | * | * | * | H | L | H | L | H | H |
| H | * | * | * | * | L | H | H | H | L | H |
| H | * | * | * | * | H | H | H | H | H | L |

FIG. 5

MEMORY SYSTEM WITH MULTIPLE BLOCK WRITE CONTROL TO CONTROL STATE DATA

FIELD

The subject matter disclosed herein relates to preserving state data and more particularly relates to preserving state data using a memory module with a plurality of memory blocks where the memory blocks are configured to preserve state data.

BACKGROUND

Description of the Related Art

When processors, memory controllers, software, or other elements in data computing are being developed, it is common to encounter errors. Errors may be difficult to find and it is often useful to preserve data at certain points in time. Each point in time may be called a "state." State data may be extremely useful in determining contents of registers, contents of memory, etc. at various points in time before a failure. Evaluation of state data may lead to discovery of what caused an error.

BRIEF SUMMARY

An apparatus for state tracing is disclosed. The apparatus, in one embodiment, includes a memory module with a plurality of memory blocks and an address decoder module that decodes one or more address lines of the plurality of memory blocks. An address output of the address decoder module corresponds to each memory block of the plurality of memory blocks. A BWE module includes a block write enable ("BWE") signal corresponding to each memory block of the plurality of memory blocks. Each BWE signal has a block write enable state and a block write disable state. In response to receiving a block write enable control ("BWEC") signal in a normal use mode, a MUX module passes a corresponding address output of the address decoder module to a write enable input of each memory block of the plurality of memory blocks. In response to receiving the BWEC signal in a state trace mode, the MUX module passes a corresponding BWE signal to the write enable input of each memory block of the plurality of memory blocks.

In one embodiment, the apparatus includes a BWE sequence module that changes each BWE signal in sequence from the block write enable state to the block write disable state such that a first state includes each BWE signal in the block write enable state and a final state includes each BWE signal in the block write disable state and each intermediate state transitions a single BWE signal from the block write enable state to the block write disable state. In another embodiment, the apparatus includes a data update module that writes first data to each memory block that has a BWE signal in the block write enable state, and writes second data to each memory block that has a BWE signal in the block write enable state after the BWE sequence module changes a BWE signal from the block write enable state to the block write disable state for a memory block. In a further embodiment, the data update module writes additional data to each memory block that has a BWE signal in the block write enable state after each time that the BWE sequence module changes a BWE signal from the block write enable state to the block write disable state.

In one embodiment, the apparatus includes a trace mode trigger module that, prior to the BWE sequence module changing a BWE signal, asserts the BWEC signal in the state trace mode, sets each BWE signal corresponding to a memory block of the plurality of memory blocks to a write enable state, and resets each memory block of the plurality of memory blocks. In another embodiment, when the BWEC is in the normal use mode, data is written to a memory block of the plurality of memory blocks when the BWEC signal is in the first state and the one or more address lines select the memory block; the data is not written to the remaining memory blocks of the plurality of memory blocks. In another embodiment, when the BWEC signal is in the state trace mode, data is written to each memory block of the plurality of memory blocks with a BWE signal in the block write enable state and data is not written to each memory block of the plurality of memory blocks with a BWE signal in the write disable state.

In one embodiment, the MUX module includes one or more multiplexers ("MUXs") with two inputs and one output for each memory block of the plurality of memory blocks. An input is a BWE signal and an input is an address output of the address decoder module and an output connects to the write enable input of a memory block. In another embodiment, the address decoder module includes an address decoder. The address decoder includes discrete hardware that receives as input the one or more address lines and that outputs a signal corresponding to each memory block of the plurality of memory blocks. Each state of the one or more address lines selects one of the plurality of memory blocks. In another embodiment, the BWE module includes a BWE register. The BWE register includes a hardware register with a bit corresponding to each BWE signal.

A system for tracing state data includes a memory controller that controls reading and writing data to a memory module. The memory module includes a plurality of memory blocks. The memory controller includes an address decoder module that decodes one or more address lines of the plurality of memory blocks. An address output of the address decoder module corresponds to each memory block of the plurality of memory blocks. The memory controller includes a BWE module with a block write enable ("BWE") signal corresponding to each memory block of the plurality of memory blocks. Each BWE signal has a block write enable state and a block write disable state.

The memory controller includes a MUX module that passes, to a write enable input of each memory block of the plurality of memory blocks, a corresponding address output of the address decoder module in response to receiving a block write enable control ("BWEC") signal in a normal use mode, or a corresponding BWE signal in response to receiving the BWEC signal in a state trace mode. In one embodiment, the system includes the memory module. In another embodiment, the system includes a processor that controls the memory module and that reads data from the memory module and that writes data to the memory module. In another embodiment, the system includes a computer controlled by the processor.

A method for state tracing is disclosed. The method includes decoding, using an address decoder module, one or more address lines of a plurality of memory blocks. An address output of the address decoder module corresponds to each memory block of the plurality of memory blocks. The method includes receiving a block write enable ("BWE") signal corresponding to each memory block of the plurality of memory blocks. Each BWE signal has a block write enable state and a block write disable state. The method includes passing, to a write enable input of each memory block of the plurality of memory blocks, one of a corresponding address output of the address decoder module in response to receiving a block write enable control ("BWEC") signal in a normal use mode, and a corresponding BWE signal in response to receiving the BWEC signal in a state trace mode.

In one embodiment, the method includes, when the BWEC signal is in the state trace mode, changing each BWE signal in sequence from the block write enable state to the block write disable state such that a first state includes each BWE signal in the block write enable state and a final state includes each BWE signal in the block write disable state and each intermediate state transitions a single BWE signal from the block write enable state to the block write disable state. In another embodiment, the method includes writing data to each memory block that has a BWE signal in the block write enable state at the write enable input of the memory block. Each memory block is a block of the plurality of memory blocks. The same data is written to each of the memory blocks with a BWE signal in the block write enable state.

In a further embodiment, the method includes one or more instances of writing additional data into each memory block with a BWE signal in the block write enable state, where a BWE signal transitions from the block write enable state to a block write disable state between each instance of writing data to the memory blocks with a BWE signal in the block write enable state and where when additional data is written, the same additional data is written to each of the memory blocks with a BWE signal in the block write enable state. In another embodiment, the method includes, when the BWEC is in the normal use mode, writing data into a memory block of the plurality of memory blocks in response to the one or more address lines asserting an address corresponding to the memory block. The data is not written to the memory blocks of the plurality of memory blocks with an address different from the memory block where data is written.

Another apparatus for tracing state data is disclosed. The apparatus includes a memory with a plurality of memory blocks and a block write enable control ("BWEC") signal in a normal use mode or a state trace mode. The apparatus includes an address decoder that decodes one or more address lines of the plurality of memory blocks and selects an address output of the address decoder in response to an address corresponding to the address output. An address output of the address decoder corresponds to each memory block of the plurality of memory blocks. The apparatus includes a block write enable ("BWE") signal that corresponds to each memory block of the plurality of memory blocks. Each BWE signal has a block write enable state and a block write disable state.

The apparatus includes two or more multiplexers ("MUXes"). Each MUX selects an input in response to the BWEC signal and passes the selected input to a write enable input of each memory block of the plurality of memory blocks. The inputs to each MUX include a corresponding address output of the address decoder and a corresponding BWE signal. Each MUX selects the corresponding address output of the address decoder in response to the BWEC signal in a normal use mode and each MUX selects the corresponding BWE signal in response to the BWEC signal in a state trace mode.

In one embodiment, the apparatus includes a BWE register with a bit corresponding to each BWE signal. A state of a bit of the BWE register controls a corresponding BWE signal. In another embodiment, the apparatus includes a BWE sequence module that, while the BWEC signal is in the state trace mode, sets each BWE signal to the block write enable state when the plurality of memory blocks are reset, changes a first BWE signal from the block write enable state to the block write disable state after data is written to each memory block of the plurality of memory blocks. The data written to each memory block comprises the same data. The BWE sequence module changes a second BWE signal from the block write enable state to the block write disable state in sequence after additional data is written to each memory block of the plurality of memory blocks with a BWE signal in the block write enable state. The additional data is written to each memory block is the same additional data.

The BWE sequence module continues to change BWE signals from the block write enable state to the block write disable state in sequence after each set of additional data is written to each memory block of the plurality of memory blocks with a BWE signal in the block write enable state until the BWE signals are all in the block write disable state. Again, the additional data written to each memory block is the same additional data. Data written to a memory block is preserved after the BWE signal to the memory block changes to the block write disable state and the memory blocks represent a data state sequence.

In one embodiment, the one or more address lines of the plurality of memory blocks are a subset of a set address lines to the plurality of memory blocks. The set of address lines address memory locations in the plurality of memory blocks and the subset of address lines correspond to highest order bits of the set of address lines. The subset of address lines is sufficient to select a memory block of the plurality of memory blocks. In one embodiment, the apparatus includes a normal use module that sets the BWEC signal to the normal use mode. In the normal use mode the MUXs connect the address decoder to the write enable inputs of the plurality of memory blocks. The normal use module enables the plurality of memory blocks to be used for general purpose data storage.

Another apparatus for tracing state data is also disclosed. The apparatus includes a memory module with a plurality of memory blocks and an address decoder module that decodes one or more address lines of the plurality of memory blocks. An address output of the address decoder module corresponds to each memory block of the plurality of memory blocks. A BWE module includes a block write enable ("BWE") signal corresponding to each memory block of the plurality of memory blocks. Each BWE signal has a block write enable state and a block write disable state. In response to receiving a block write enable control ("BWEC") signal in a normal use mode, a MUX module passes a corresponding address output of the address decoder module to a write enable input of each memory block of the plurality of memory blocks. In response to receiving the BWEC signal in a state trace mode, the MUX module passes a corresponding BWE signal to the write enable input of each memory block of the plurality of memory blocks.

The apparatus includes a BWE sequence module that changes each BWE signal in sequence from the block write enable state to the block write disable state such that a first state includes each BWE signal in the block write enable state and a final state includes each BWE signal in the block write disable state and each intermediate state transitions a single BWE signal from the block write enable state to the block write disable state. The apparatus includes a data update module that writes first data to each memory block that has a BWE signal in the block write enable state, and writes second data to each memory block that has a BWE signal in the block write enable state after the BWE sequence module changes a BWE signal from the block write enable state to the block write disable state for a memory block. The data update module writes additional data to each memory block that has a BWE signal in the block write enable state after each time that the BWE sequence module changes a BWE signal from the block write enable state to the block write disable state.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a truth table for an apparatus for using memory blocks to track state data in accordance with the present invention;

DETAILED DESCRIPTION OF THE INVENTION

Figure 1:
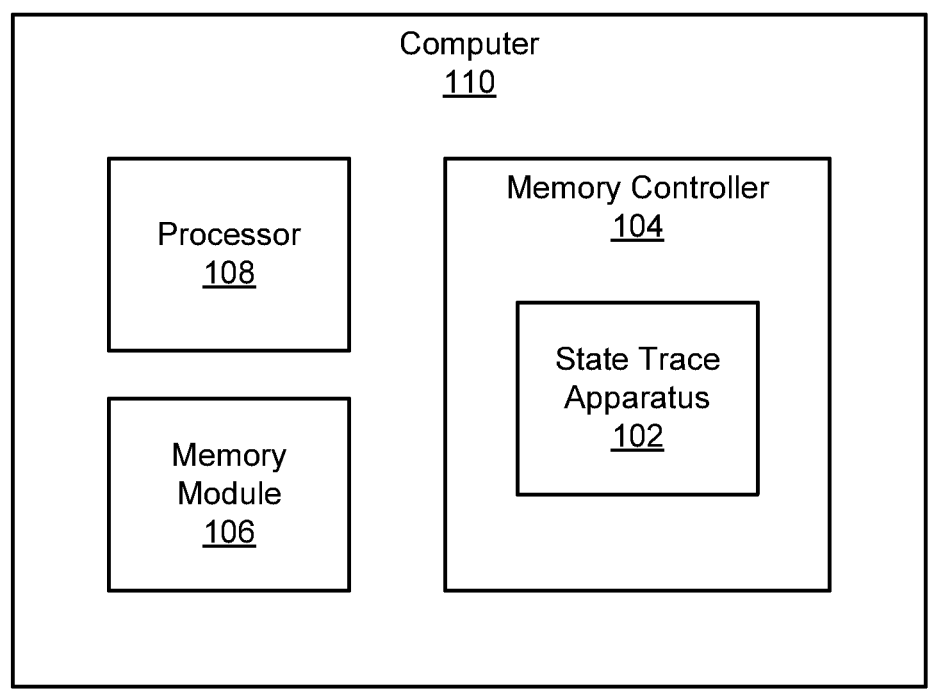
FIG. 1 is a schematic block diagram illustrating one embodiment of a system for using memory blocks to track state data in accordance with the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, one or more aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor. The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

Furthermore, the described features, structures, or characteristics of the embodiments may be combined in any suitable manner. In the following description, numerous specific details are provided, such as examples of programming, software modules, user selections, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by hardware and/or computer readable program code.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, hardware, or portion of code, which comprises one or more executable instructions of the program code for implementing the specified logical function(s).

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

The description of elements in each figure may refer to elements of proceeding figures. Like numbers refer to like elements in all figures, including alternate embodiments of like elements.

FIG. 1 is a schematic block diagram illustrating one embodiment of a system 100 for using memory blocks to track state data in accordance with the present invention. The system 100, in one embodiment, includes a state trace apparatus 102 in a memory controller 104, a memory module 106, a processor 108, and a computer 110, which are explained below.

The system 100 includes a state trace apparatus 102, which will be explained in more detail in other figures. The state trace apparatus 102, in one embodiment, is part of a memory controller 104. A memory controller 104 is known in the art and typically controls data to and from memory, such as the memory module 106. The memory controller 104, in one embodiment, is connected to the processor 108 and may receive instructions from the processor 108. The memory controller 104 may be separate from the processor 108, for example as part of a northbridge, or may be a die on the processor 108. The memory controller 104 may receive read and write instructions, possibly in the form of a logical block address ("LBA") or other low level command where an address and offset, address range, etc. are received along with a command to read or write data. In other embodiments, the memory controller 104 may be able to receive higher order commands, such as object requests where data is identified by something other than and address. For example, data may be identified with a logical identifier and the memory controller 104 may include a mapping between a logical identifier and an actual memory location.

In one embodiment, the memory controller 104 is capable of servicing a direct memory access ("DMA") process or a remote DMA ("RDMA") process to transfer data directly from a data storage location to memory. The memory controller 104 may include address lines and data lines to memory such as the memory module 106 to access specific data locations for writing and reading data. In one embodiment, a block write enable input to a memory block controls whether or not data is written to the memory block. For example, if a particular address is selected and the memory controller 104 asserts a block write enable ("BWE") signal, data present on data lines may be written to a memory location corresponding to the address. The write may be in response to a typical write command or may be part of state trace activity, which will be explained in more detail below.

In one embodiment, the system 100 includes a memory module 106 that includes a plurality of memory blocks. Each memory block may be separately accessible. For example, if the system 100 includes a certain number of address lines, one or more address lines corresponding to upper address bits may select individual memory blocks. In a simple example, if an address comprises 8-bits, two address lines corresponding to two upper bits may be used to select four memory blocks in the memory module 106. An address of logic 00 on the two address lines may access a first memory block, an address of 01 on the two address lines may access a second memory block, an address of 10 on the two address lines may access a third memory block, and an address of 11 on the two address lines may access a fourth memory block. The remaining six lower level address lines may select memory locations in each of the four memory blocks.

The memory module 106 may be all or part of memory controlled by the memory controller 104. For example, the memory controller 104 may control some memory while memory blocks of the memory module 106 may be controlled for use with the state trace apparatus 102.

The processor 108 may be a typical microprocessor, may be a dedicated state machine, may be a programmable hardware device such as a field programmable gate array, programmable array logic, a programmable logic device or the like. The processor 108, and other system 100 components, may be part of an application specific integrated circuit ("ASIC"), or the like. The computer 110 may be a mainframe computer, a desktop computer, a laptop computer, a smart phone, a tablet computer, a workstation, or any other device with memory. One of skill in the art will recognize other memory controllers, memory modules 106, processors 108, and computers 110 (or like devices) where a state trace apparatus 102 may be used.

Figure 2:
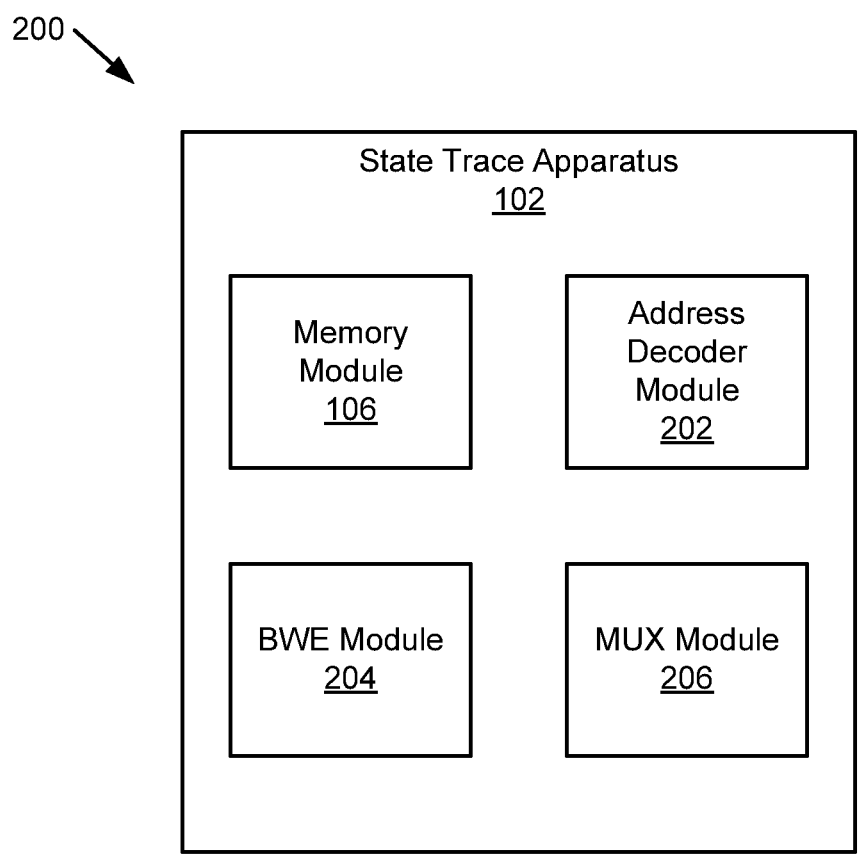
FIG. 2 is a schematic block diagram illustrating one embodiment of an apparatus for using memory blocks to track state data in accordance with the present invention.

FIG. 2 is a schematic block diagram illustrating one embodiment of an apparatus 200 for using memory blocks to track state data in accordance with the present invention. The apparatus 200 includes, in one embodiment, a state trace apparatus 102 with a memory module 106, an address decoder module 202, a BWE module 204, and a MUX module 206, which are explained below. Note that the memory module 106 is shown within the state trace apparatus 102 in the depicted embodiment. In other embodiments the memory module 106 may be external to the state trace apparatus 102. The memory module 106 may be similar to the memory module 106 shown in FIG. 1.

In one embodiment, the state trace apparatus 102 includes an address decoder module 202 that decodes one or more address lines of the plurality of memory blocks in the memory module 106. An address output of the address decoder module 202 corresponds to each memory block of the plurality of memory blocks in the memory module 106. For N example, if the memory module 106 includes four memory blocks, two address lines may be used to select each of the four memory blocks. The address decoder module 202 may include four address outputs; one for each memory block. A memory module 106 with two memory blocks may be accessed with one address line so an address decoder module 202 for a two-block memory module 106 may receive one address line. A memory module 106 with eight memory blocks may be accessed with three address line so an address decoder module 202 for an eight-block memory module 106 may connect to three address lines.

In one aspect of the invention, the memory module 106 may be used for general data storage in a normal use mode and memory blocks of the memory module 106 may be used to store state data in a state trace mode. Note that the number of states that may be stored in the memory module 106 affects how much memory is available during a state trace mode. For example, if four states are stored, the memory in the memory module 106 available for storing state data is one-fourth the capacity of when the memory module 106 is used for general data storage. If eight states are stored, the memory in the memory module 106 available for storing state data is one-eighth the capacity of when the memory module 106 is used for general data storage. This memory reduction trait of the state trace apparatus 102 will be more readily apparent as various embodiments are described below.

In one embodiment, the state trace apparatus 102 includes a BWE module 204 that includes a block write enable ("BWE") signal corresponding to each memory block of the plurality of memory blocks in the memory module 106. Each BWE signal has a block write enable state and a block write disable state. In one embodiment, the block write enable state is a logic "1" and the block write disable state is a logic "0." A BWE signal may be used to disable writing data to a memory block in the state trace mode to preserve data previously written to the memory block, thus preserving the state of the data at a moment of time just before the BWE signal transitioned from the block write enable state to the block write disable state.

If the memory module 106 is reset, typically the BWE signals of the BWE module 204 are in the block write enable state, or in a particular embodiment, logic "0." Data may be then written to the memory module 106 and the same data is written to each memory block of the plurality of memory blocks in the memory module 106, if a BWE signal for a memory block transitions to a block write disable state, logic "1" in one embodiment, the next time data is written the to the memory blocks of the memory module 106, the memory block with the BWE signal in the block write disable state will not allow data to overwrite the previous data so the previous data is preserved.

In one embodiment, the BWE module 204 includes a BWE register. The BWE register may be a hardware register where each BWE signal corresponds to a bit in the BWE register. For example, storing a particular bit pattern to the BWE register controls the BWE signals. If a particular embodiment includes a memory module 106 with four memory blocks, the BWE register may have four bits. If a "1000" is stored to the BWE register, the first BWE signal may dictate that a corresponding first memory block is inhibited from writing data and the remaining BWE signals are logic "0" so that the remaining memory blocks may have data written to them.

In one embodiment, the state trace apparatus 102 includes a MUX module 206. The MUX module 206 has at least one output and two inputs for each memory block of the memory module 106. If a block write enable control ("BWEC") signal is in a state trace mode, for example a logic "0," the MUX module 206 connects a BWE signal to and output of the MUX module 206, which is connected to a write enable input of a memory block of the memory module 106. Each BWE signal of the BWE module 204 is connected to a separate MUX output so each BWE signal is fed to a write enable input of a memory block. In the case where the BWEC signal is in the state trace mode, the BWE signals control which memory blocks are available to have data written. The BWEC signal may be connected to a control input of each MUX of the MUX module 206. In one embodiment, the MUX module 206 is a collection of MUXes. In another embodiment, the MUX module 206 may have a MUX that has multiple outputs where each output may select at least two inputs based on the BWEC signal.

If the BWEC signal is in a normal use mode (for example a logic "1"), the MUX module 206 connects an address output of the address decoder module 202 to a MUX output, which is connected to the write enable input of a memory block. In one embodiment, each address output of each address decoder module 202 connects to a corresponding memory block of the memory module 106. In the normal use mode, when data is written to a particular address, the address lines to the address decoder module 202 will enable data to be written to a memory block of the memory module 106 corresponding to the selected address. In one embodiment, the BWEC signal corresponds to a bit in a register. For example, the bit may be part of a BWE register where some bits correspond to BWE signals while one bit corresponds to the BWEC signal. In another embodiment, the BWEC signal may correspond to a separate register or the BWEC signal may be a bit that is part of some other register.

Figure 3:
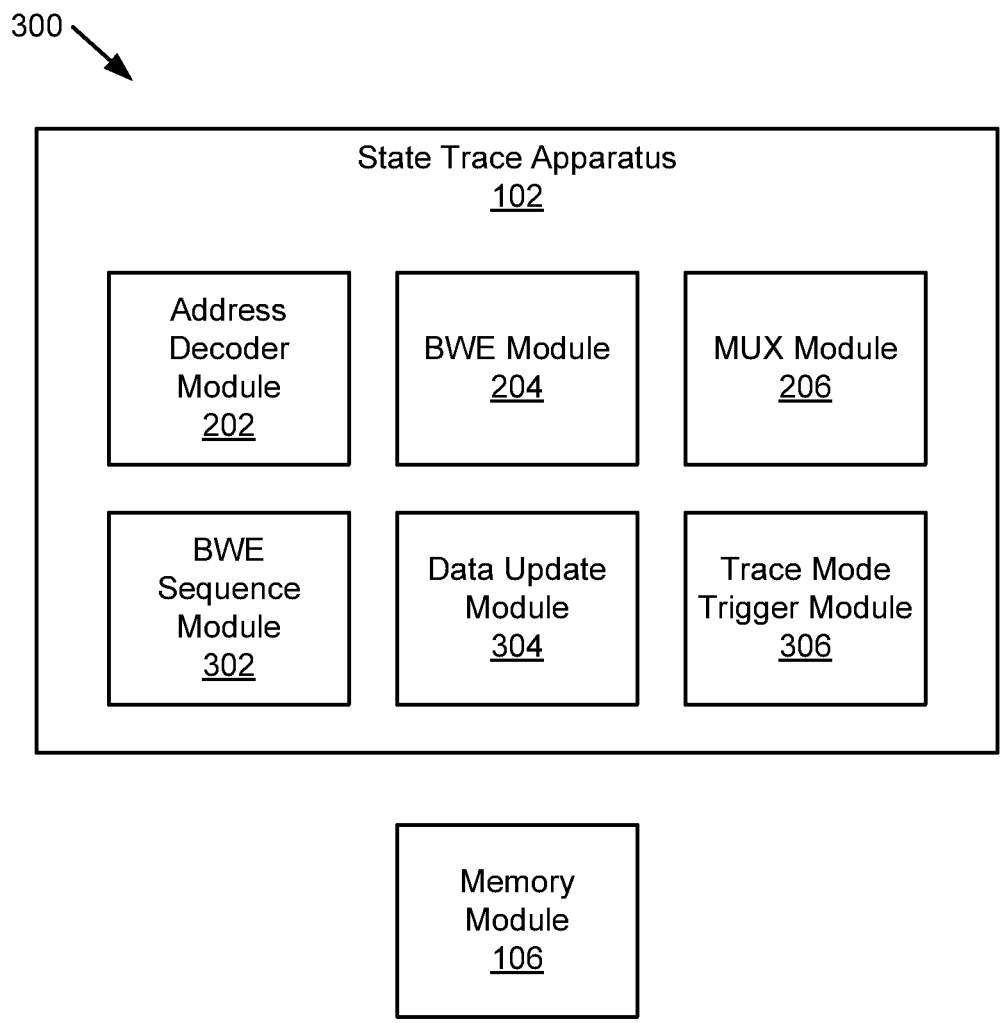
FIG. 3 is a schematic block diagram illustrating another embodiment of an apparatus for using memory blocks to track state data in accordance with the present invention.

FIG. 3 is a schematic block diagram illustrating another embodiment of an apparatus 300 for using memory blocks to track state data in accordance with the present invention. The apparatus 300 includes, in one embodiment, a state trace apparatus 102 with an address decoder module 202, a BWE module 204, and a MUX module 206, which are substantially similar to those described in relation the apparatus 200 of FIG. 2. A memory module 106 is not included in the state trace apparatus 102 in the depicted embodiment and may be external to the state trace apparatus 102. The apparatus 300 includes, in various embodiments, a BWE sequence module 302, a data update module 304, and a trace mode trigger module 306, which are described below.

In one embodiment, the state trace apparatus 102 includes a BWE sequence module 302 that changes each BWE signal in sequence from the block write enable state to the block write disable state. In one embodiment, a first state may have each BWE signal in the block write enable state and a final state may have each BWE signal in the block write disable state and each intermediate state transitions a single BWE signal from the block write enable state to the block write disable state. In a simple example, if the memory module 106 includes four memory blocks, the BWE sequence module 302 may initialize the BWE signals so each has logic "0" (i.e. "0000"). The BWE sequence module 302 may make a first transition to BWE signals to "1000," a second transition to "1100," a third transition to "1110" and a fourth transition to "1111."

In another embodiment, the state trace apparatus 102 includes a data update module 304 that writes first data to each memory block that has a BWE signal in the block write enable state. The data update module 304 also writes second data to each memory block that has a BWE signal in the block write enable state after the BWE sequence module 302 changes a BWE signal from the block write enable state to the block write disable state for a memory block. The data update module 304 may then write additional data to each memory block that has a BWE signal in the block write enable state after each time that the BWE sequence module 302 changes a BWE signal from the block write enable state to the block write disable state. In the state trace mode, when data is written to memory blocks of the memory module 106, the same data is written to each memory block.

The BWE sequence module 302 and the data update module 304 may work together to change a BWE signal after each data write so that each memory block will represent a state of the data. In other words, each memory block may include data written at a particular time. The state data may be used to determine memory contents at various points in time during a debug operation.

In one embodiment, the state trace apparatus 102 includes a trace mode trigger module 306 that acts prior the BWE sequence module 302 changing a signal to assert the BWEC signal in the state trace mode and to set each BWE signal corresponding to a memory block of the memory module 106 to a write enable state and also resets each memory block of the memory module 106. The trace mode trigger module 306 may, in one embodiment, write data to each memory location in the memory blocks so that the memory blocks are reset. For example, the trace mode trigger module 306 may write all zeros or all ones to each memory location in the memory blocks. In another embodiment, the trace mode trigger module 306 takes alternate steps and/or additional steps to prepare the memory blocks, the BWE signals, or other elements for a state trace mode.

Figure 4A:
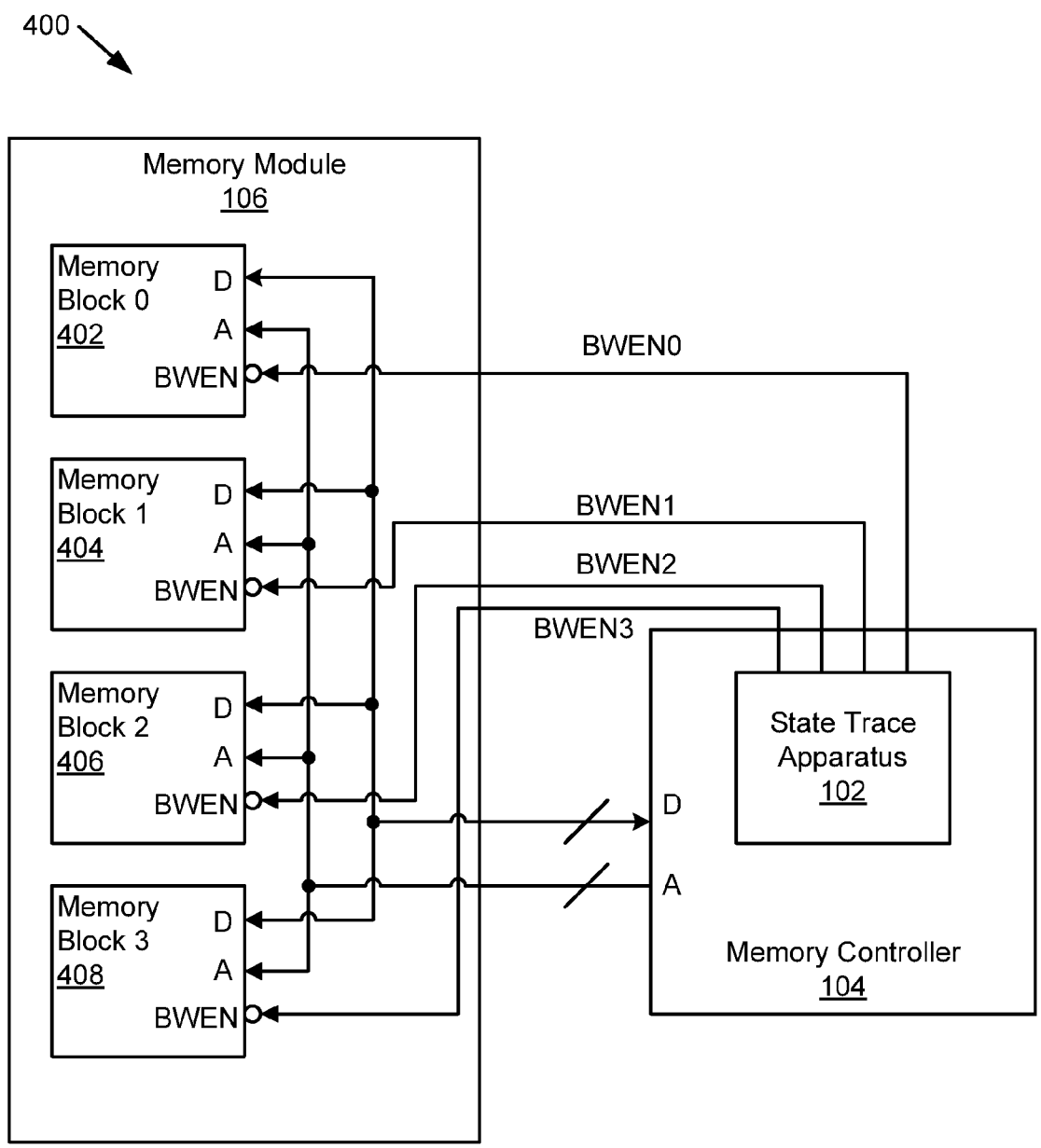
FIG. 4A is a first part of a schematic block diagram illustrating a particular embodiment of an apparatus for using memory blocks to track state data in accordance with the present invention.
Figure 4B:
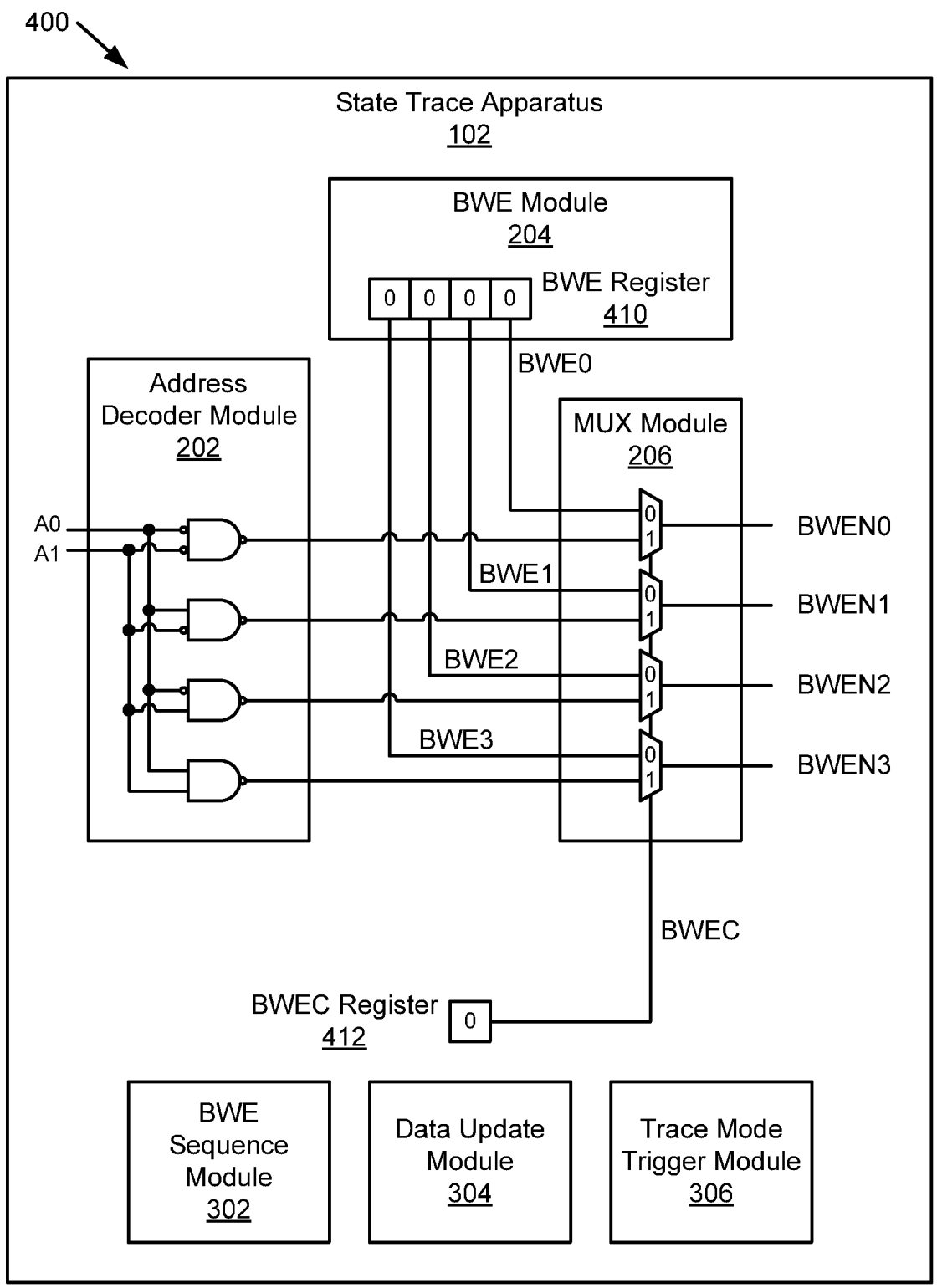
FIG. 4B is a second part of a schematic block diagram illustrating a particular embodiment of an apparatus for using memory blocks to track state data in accordance with the present invention.

FIGS. 4A and 4B are a first part and a second part respectively of a schematic block diagram illustrating a particular embodiment of an apparatus 400 for using memory blocks to track state data in accordance with the present invention. FIG. 4A depicts a particular embodiment of a memory module 106 with a memory block 0 402, a memory block 1 404, a memory block 2 406, and a memory block 3 408. Each memory block 402-408 includes a block write enable input ("BWEN"), an address input ("A"), and a data input ("D"). While a single line is shown for each of the data input and address input, one of skill in the art will recognize that the single line may represent multiple address and data lines. In one embodiment, each memory block 402-408 may have data written when the BWEN input is low. The memory controller 104 depicted is simplified and includes a state trace apparatus 102 that is depicted in more detail in FIG. 4B. The data and address ports on the memory controller 104 are typically used to control data transfer to the memory module 106. Each BWEN input to a memory block 402-408 includes a separate connection to the state trace apparatus 102, which are labeled BWEN0, BWEN1, BWEN2, and BWEN3. The BWEN signals are defined further in FIG. 4B.

FIG. 4B includes a state trace apparatus 102 matching the state trace apparatus of FIG. 4A. The state trace apparatus 102 includes one embodiment of a state trace apparatus 102 and may include modules 202, 204, 206, 302, 304, 306 which are substantially similar to those described in relation to the apparatuses 200, 300 of FIGS. 2 and 3. In the depicted embodiment, the address decoder module 202 includes NAND gates with various inverted inputs to decode address lines A0 and A1. With two address lines as input, up to four address locations may be selected where each address location may correspond to a memory block (e.g. 402). For example, based on the logic shown, when A0 is logic "0" and A1 is logic "0," the top NAND gate of the address decoder module 202 has a logic "0" output and the other NAND gates have a logic "1" output.

The state trace apparatus 102 includes a BWE module 204 that has a BWE register 410 with four bits corresponding to four BWE signals, BWE0, BWE1, BWE2, and BWE3. As contents of the BWE register 410 change, the BWE signals change. The state trace apparatus 102, in one embodiment, includes a BWEC register 412 and changes to the BWEC register 412 affect the BWEC signal. In one embodiment the state trace apparatus 102 includes a BWE sequence module 302, a data update module 304, and a trace mode trigger module 306, which may affect the BWE register 410, the BWEC register 412 and timing. For example, the trace mode trigger module 306 may set the BWE register 410 to "0000" and the BWEC register 412 to "0" while resetting the memory blocks 402-408. The BWE sequence module 302 may change the BWE register 410 contents in sequence. Data may be written by way of the data update module 304 such that the BWE sequence module 302 changes the BWE register 410 between data updates.

The state trace apparatus 102, in one embodiment, includes a MUX module 206 with four MUXes. Each MUX has an input connected to a BWE signal and an input connected to an output of the address decoder module 202. Each MUX also includes an output that is a BWEN signal connecting as shown to the memory blocks 402-408 of the memory module 106 in FIG. 4A. FIG. 5 is a truth table that corresponds to the apparatus 400 of FIGS. 4A and 4B. When BWEC is low (i.e. logic "0"), address lines A0, A1 are neglected and the state of the BWE signals are outputted to the BWEN inputs of the memory blocks 402-408. When BWEC is high (i.e. logic "1"), the BWE signals are neglected. Also when BWEC is high, a value obtained by decoding A0, A1 is outputted to the appropriate BWEN signal so that the appropriate memory block 402-408 is enabled for writing data. For example, with BWEC high, if A0 and A1 are low, BWEN0 is low, thus enabling data to be written to memory block 0 402 and BWEN1, BWEN2, and BWEN3 are high so the other memory blocks 404-408 are disabled from having data written.

Figure 6:
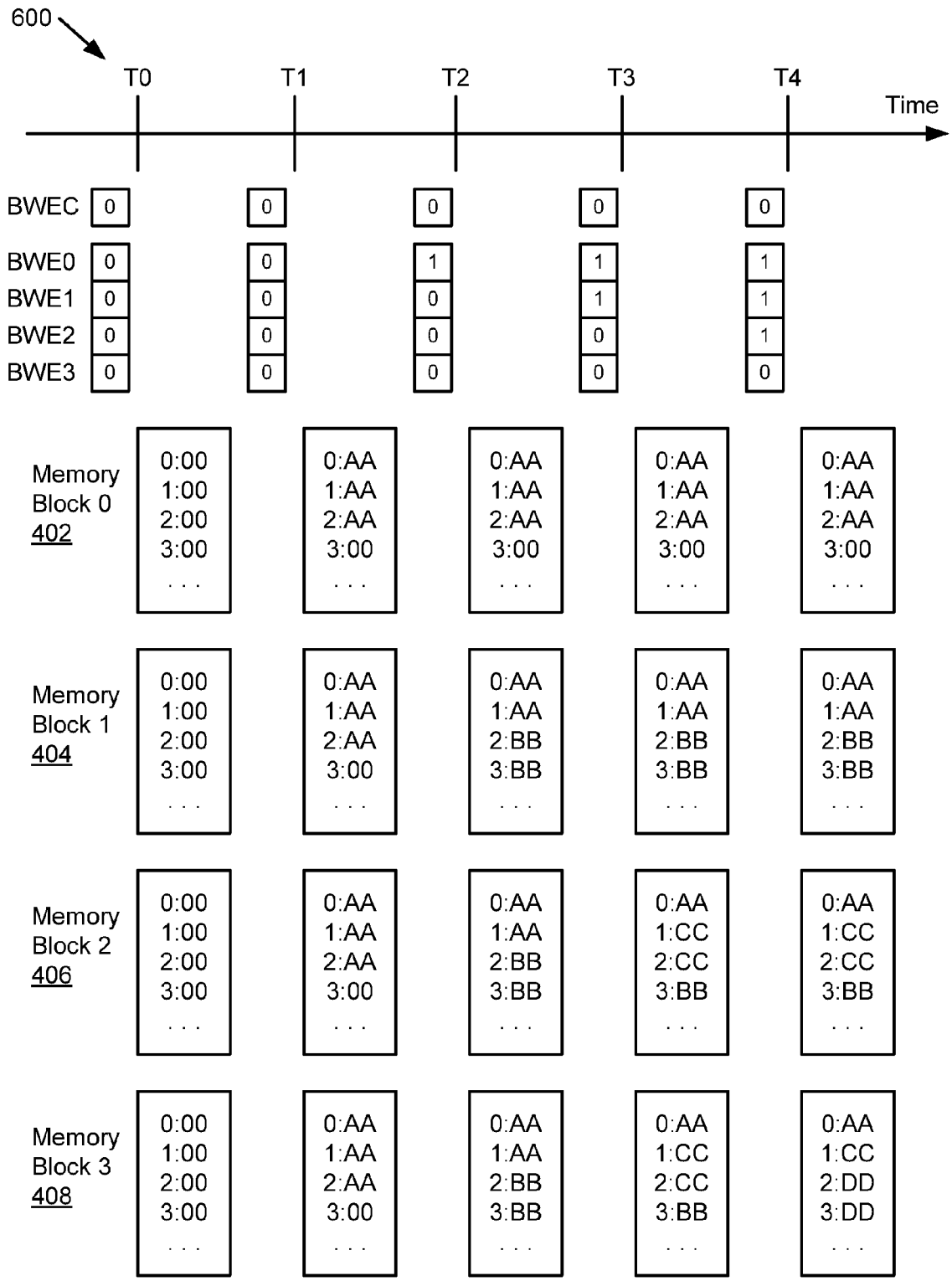
FIG. 6 is an example timing diagram of an apparatus for using memory blocks to track state data in accordance with the present invention.

FIG. 6 is an example timing diagram 600 of an apparatus for using memory blocks to track state data in accordance with the present invention. The example 600, in one embodiment, corresponds to the apparatus 400 of FIGS. 4A and 4B. In the example, before time T0 the BWEC register 412 and the BWE register 410 are all reset so each bit is low. After time T0 data is written to memory blocks 0-3 402-408 so that the contents of the memory blocks 402-408 are all 00. In one embodiment, the trace mode trigger module 306 resets the memory blocks and the contents of the BWEC register 412 and the BWE register 410.

After time T1, AA is written to locations 0, 1, 2, and 3 of each of the memory blocks 402-408. At this moment in time, all four memory blocks 402-408 include current state data. In one embodiment, the data update module 304 writes data to the memory blocks 402-408. Before time T2, BWE0 is changed to high. After time T2, BB is written to memory locations 2 and 3 of memory blocks 1, 2, and 3 404, 406, 408. Before time T3 BWE1 is changed to high and BWE0 remains high. This disables memory block 1 404 from being written to. After time T3, CC is written to memory locations 1 and 2 in memory blocks 2 and 3 406, 408. Memory blocks 0 and 1 402, 404 remain unchanged, thus preserving state data before time T3.

Before time T4, BWE2 is changed to high while BWE0 and BWE1 remain high. BWE3 remains low. Memory blocks 0, 1, and 2 402, 404, 406 are disabled from being written to so only memory block 3 408 is available for writing. After time T4, DD is written to memory locations 2 and 3 in memory block 3 408. At this point, memory block 3 408 reflects a current data state after time T4, memory block 2 406 reflects a data state after time T3, memory block 1 404 reflects a data state after time T2, and memory block 0 402 reflects a data state after time T1. The state data reflected in the memory blocks 402-404 can be used for debugging or other processes where a history of what was contained in memory at various points in time may be useful.

Note that while the depicted example 600 shows data changing sequentially, in other embodiments data may change one or more times between changes of the BWE signals. In addition, other embodiments may include more or less than four memory blocks in a memory module 106. In other embodiments, the memory module 106 may be a portion or all of memory accessed by a processor 108 or controlled by a memory controller 104. In the depicted example 600, only a small amount of bits are changed for simplicity, but one of skill in the art will recognize that memory blocks may have more bits, such as 64-bits, 128-bits, etc. and a memory block may have many addressable memory locations. In other embodiments, a memory block may be small and may reflect register data. One of skill in the art will recognize other configurations that may be used with a state trace apparatus 102 and a memory module 106 with a plurality of memory blocks.

Figure 7:
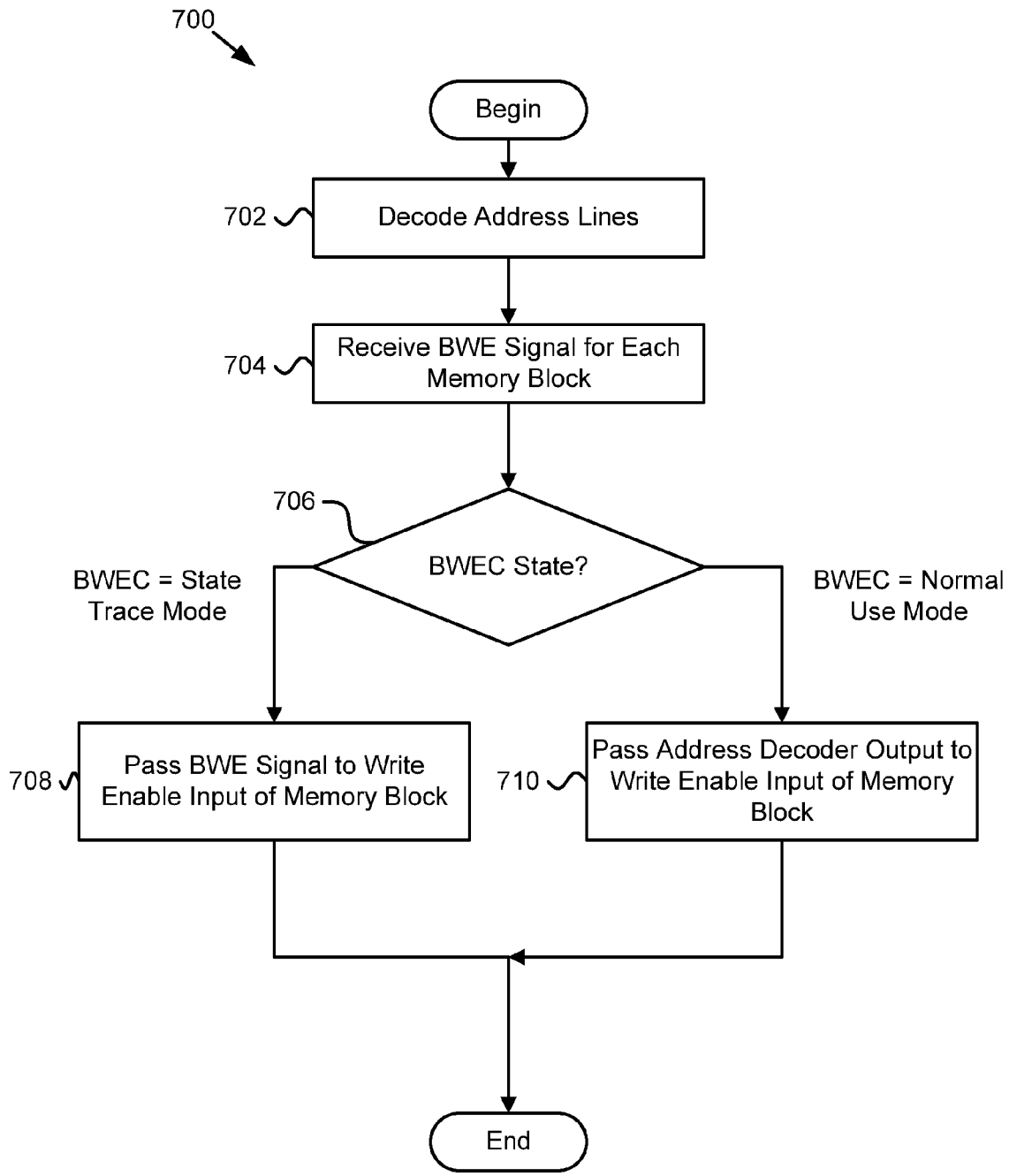
FIG. 7 is a schematic flow chart diagram illustrating one embodiment of a method for using memory blocks to track state data in accordance with the present invention.

FIG. 7 is a schematic flow chart diagram illustrating one embodiment of a method 700 for using memory blocks to track state data in accordance with the present invention. The method 700 begins and decodes 702 one or more address lines of a plurality of memory blocks. An address output corresponds to each memory block of the plurality of memory blocks. In one embodiment, an address decoder module 202 decodes 702 the address lines and the address outputs corresponding to each memory block are address outputs of the address decoder module 202.

The method 700 receives 704 a BWE signal corresponding to each memory block of the plurality of memory blocks. Each BWE signal has a block write enable state and a block write disable state. In one embodiment, a BWE module 204 includes the BWE signals and may include a BWE register 410. The method 700 determines 706 a state of the BWEC signal. If the method 700 determines 700 that the BWEC signal is in a state trace mode, the method 700 passes 708 a BWE signal corresponding to each memory block to a block write enable input of the memory block, and the method 700 ends. If the method 700 determines 700 that the BWEC signal is in a normal use mode, for each memory block the method 700 passes 710 an address decoder output to the block write enable input of the corresponding memory block, and the method 700 ends. In one embodiment, the MUX module 206 determines 706 if the BWEC signal is in the state trace mode or the normal use mode and passes 708 the BWE signal or passes 710 the address decoder output to the memory blocks.

Figure 8:
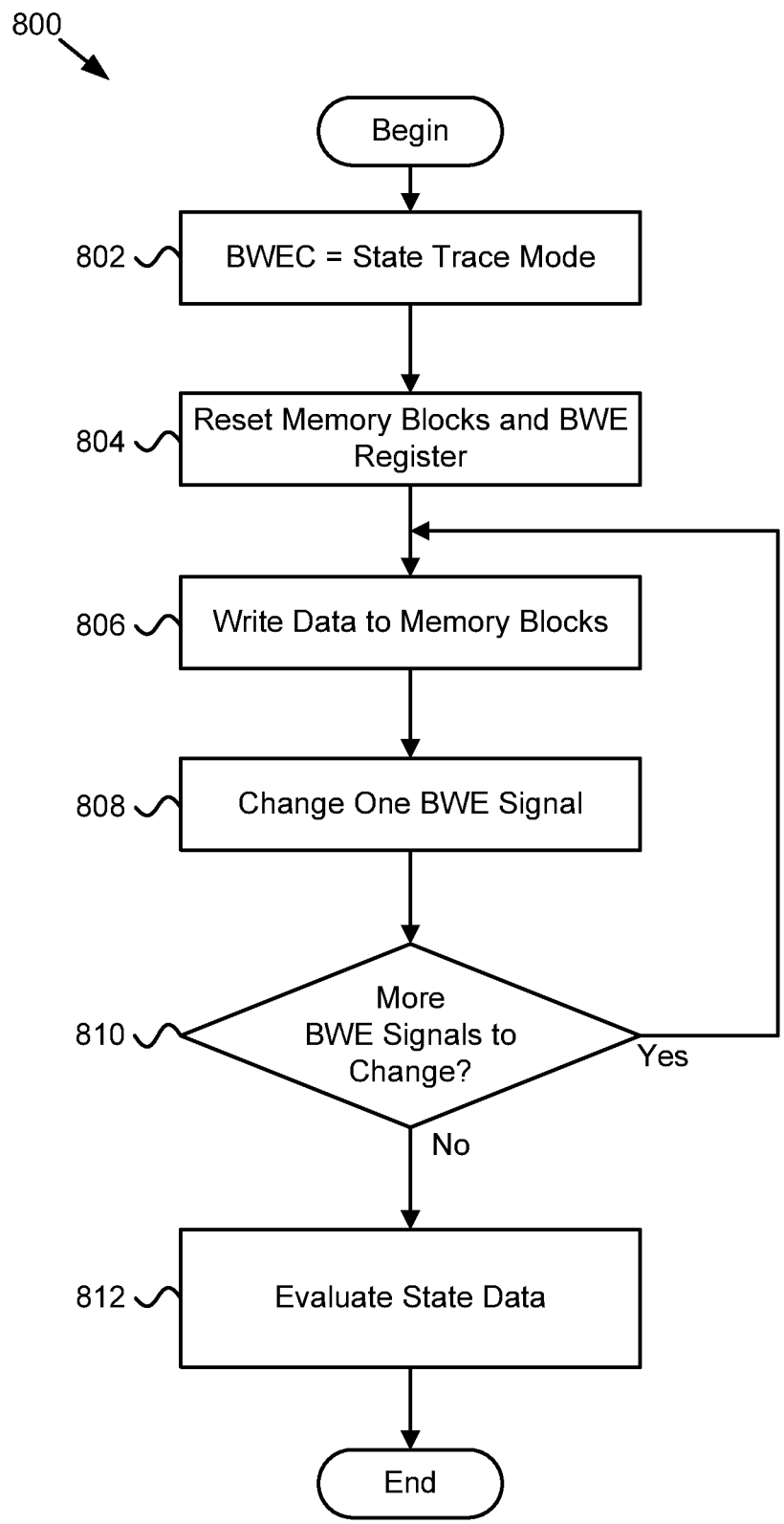
FIG. 8 is a schematic flow chart diagram illustrating another embodiment of a method for using memory blocks to track state data in accordance with the present invention.

FIG. 8 is a schematic flow chart diagram illustrating another embodiment of a method 800 for using memory blocks to track state data in accordance with the present invention. The method 800 begins and determines 802 that the BWEC signal is in the state trace mode. In one embodiment, the MUX module 206 determines 802 that the BWEC signal is in the state trace mode. The method 800 resets 804 the memory blocks and the BWE register. In one embodiment, the trace mode trigger module 306 resets 804 the BWE register and memory blocks.

The method 800 writes 806 data to the memory blocks and changes 808 one BWE signal. In one embodiment, the BWE signal changes 808 from a block write enable state to a block write disable state. For example, the BWE signal changes 808 from a logic "0" to a logic "1." The data update module 304 may write 806 the data to the memory blocks and the BWE sequence module 302 may change 808 the BWE signal. The method 800 determines 810 if there are more BWE signals to change. For example, if there are four BWE signals and a first BWE signal (e.g. BWE0) is changed 808, the method 800 may determine 810 that there are additional BWE signals to change.

If the method 800 determines 810 that there are more BWE signals to change, the method 800 returns and writes 806 additional data to memory blocks with a BWE signal in a block write enable state. If the method 800 determines 810 that there are no more BWE signals to change, the method 800 evaluates 812 state data stored in the memory blocks and the method 800 ends. In one embodiment, the BWE sequence module 302 determines 810 if there are additional BWE signals to change.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a memory module comprising a plurality of memory blocks;
    an address decoder module that decodes one or more address lines of the plurality of memory blocks, wherein an address output of the address decoder module corresponds to each memory block of the plurality of memory blocks;
    a BWE module comprising a block write enable ("BWE") signal corresponding to each memory block of the plurality of memory blocks, wherein each BWE signal has a block write enable state and a block write disable state;
    a MUX module that passes, to a write enable input of each memory block of the plurality of memory blocks, one of
        a corresponding address output of the address decoder module in response to receiving a block write enable control ("BWEC") signal in a normal use mode; and
        a corresponding BWE signal in response to receiving the BWEC signal in a state trace mode;
    a BWE sequence module that changes each BWE signal in sequence from the block write enable state to the block write disable state wherein a first state of the sequence comprises each BWE signal in the block write enable state and a final state of the sequence comprises each BWE signal in the block write disable state and each intermediate state of the sequence between the first state and the final state transitions a single BWE signal from the block write enable state to the block write disable state; and
    a data update module that, in response to the BWEC signal being in the state trace mode, writes, during a write operation, data to each memory block that has a BWE signal in the block write enable state, and does not write the data to each memory block that has a BWE signal in the block write disable state.

2. The apparatus of claim 1, wherein the data update module writes first data to each memory block that has a BWE signal in the block write enable state, and writes second data to each memory block that has a BWE signal in the block write enable state after the BWE sequence module changes a BWE signal from the block write enable state to the block write disable state for a memory block.

3. The apparatus of claim 2, wherein the data update module writes additional data to each memory block that has a BWE signal in the block write enable state after each time that the BWE sequence module changes a BWE signal from the block write enable state to the block write disable state.

4. The apparatus of claim 1, further comprising a trace mode trigger module that, prior to the BWE sequence module changing a BWE signal,
    asserts the BWEC signal in the state trace mode;
    sets each BWE signal corresponding to a memory block of the plurality of memory blocks to a write enable state; and
    resets each memory block of the plurality of memory blocks.

5. The apparatus of claim 1, wherein when the BWEC is in the normal use mode, data is written to a memory block of the plurality of memory blocks when the BWEC signal is in the normal use mode and the one or more address lines select the memory block, and wherein the data is not written to the remaining memory blocks of the plurality of memory blocks.

6. The apparatus of claim 1, wherein when the BWEC signal is in the state trace mode, data is written to each memory block of the plurality of memory blocks with a BWE signal in the block write enable state and data is not written to each memory block of the plurality of memory blocks with a BWE signal in the write disable state.

7. The apparatus of claim 1, wherein the MUX module comprises one or more multiplexers ("MUXs") with two inputs and one output for each memory block of the plurality of memory blocks, wherein an input comprises a BWE signal and an input comprises an address output of the address decoder module and an output connects to the write enable input of a memory block.

8. The apparatus of claim 1, wherein the address decoder module comprises an address decoder, the address decoder comprising discrete hardware that receives as input the one or more address lines and that outputs a signal corresponding to each memory block of the plurality of memory blocks, wherein each state of the one or more address lines selects one of the plurality of memory blocks.

9. The apparatus of claim 1, wherein the BWE module comprises a BWE register, the BWE register comprising a hardware register with a bit corresponding to each BWE signal.

10. A system comprising:
    a memory controller controlling reading and writing data to a memory module, the memory module comprising a plurality of memory blocks, the memory controller comprising
        an address decoder module that decodes one or more address lines of the plurality of memory blocks, wherein an address output of the address decoder module corresponds to each memory block of the plurality of memory blocks;
        a BWE module comprising a block write enable ("BWE") signal corresponding to each memory block of the plurality of memory blocks, wherein each BWE signal has a block write enable state and a block write disable state;
a MUX module that passes, to a write enable input of each memory block of the plurality of memory blocks, one of a corresponding address output of the address decoder module in response to receiving a block write enable control ("BWEC") signal in a normal use mode, and a corresponding BWE signal in response to receiving the BWEC signal in a state trace mode;
a BWE sequence module that changes each BWE signal in sequence from the block write enable state to the block write disable state wherein a first state of the sequence comprises each BWE signal in the block write enable state and a final state of the sequence comprises each BWE signal in the block write disable state and each intermediate state of the sequence between the first state and the final state transitions a single BWE signal from the block write enable state to the block write disable state; and
a data update module that, in response to the BWEC signal being in the state trace mode, writes, during a write operation, data to each memory block that has a BWE signal in the block write enable state, and does not write the data to each memory block that has a BWE signal in the block write disable state.

11. The system of claim 10, further comprising the memory module.

12. The system of claim 10, further comprising a processor that controls the memory module and that reads data from the memory module and that writes data to the memory module.

13. The system of claim 12, further comprising a computer, the computer controlled by the processor.

14. A method for state tracing comprising:
decoding, using an address decoder module, one or more address lines of a plurality of memory blocks, wherein an address output of the address decoder module corresponds to each memory block of the plurality of memory blocks;
receiving a block write enable ("BWE") signal corresponding to each memory block of the plurality of memory blocks, wherein each BWE signal has a block write enable state and a block write disable state;
passing, to a write enable input of each memory block of the plurality of memory blocks, one of
a corresponding address output of the address decoder module in response to receiving a block write enable control ("BWEC") signal in a normal use mode; and
a corresponding BWE signal in response to receiving the BWEC signal in a state trace mode:,
when the BWEC signal comprises the state trace mode, changing each BWE signal in sequence from the block write enable state to the block write disable state wherein a first state of the sequence comprises each BWE signal in the block write enable state and a final state of the sequence comprises each BWE signal in the block write disable state and each intermediate state of the sequence between the first state and the final state transitions a single BWE signal from the block write enable state to the block write disable state; and
writing data to each memory block that has a BWE signal in the block write enable state at the write enable input of the memory block and not writing the data to each memory block that has a BWE signal in the block write disable state, each memory block comprising a block of the plurality of memory blocks, wherein the same data is written to each of the memory blocks with a BWE signal in the block write enable state.

15. The method of claim 14, wherein a first state of the sequence comprises each BWE signal in the block write enable state and a final state of the sequence comprises each BWE signal in the block write disable state and each intermediate state transitions a single BWE signal from the block write enable state to the block write disable state.

16. The method of claim 14, further comprising one or more instances of writing additional data into each memory block with a BWE signal in the block write enable state, wherein a BWE signal transitions from the block write enable state to a block write disable state between each instance of writing data to the memory blocks with a BWE signal in the block write enable state and wherein when additional data is written, the same additional data is written to each of the memory blocks with a BWE signal in the block write enable state.

17. The method of claim 14, further comprising, when the BWEC comprises the normal use mode, writing data into a memory block of the plurality of memory blocks in response to the one or more address lines asserting an address corresponding to the memory block, wherein the data is not written to the memory blocks of the plurality of memory blocks with an address different from the memory block where data is written.

18. An apparatus comprising:
a memory comprising a plurality of memory blocks;
a block write enable control ("BWEC") signal in one of a normal use mode and a state trace mode;
an address decoder that decodes one or more address lines of the plurality of memory blocks and selects an address output of the address decoder in response to an address corresponding to the address output, wherein an address output of the address decoder corresponds to each memory block of the plurality of memory blocks;
a block write enable ("BWE") signal corresponding to each memory block of the plurality of memory blocks, wherein each BWE signal has a block write enable state and a block write disable state; and
two or more multiplexers ("MUXes"), each MUX selecting an input in response to the BWEC signal and passing the selected input to a write enable input of each memory block of the plurality of memory blocks, the inputs to each MUX comprising a corresponding address output of the address decoder and a corresponding BWE signal, wherein each MUX selects the corresponding address output of the address decoder in response to the BWEC signal in a normal use mode and wherein each MUX selects the corresponding BWE signal in response to the BWEC signal in a state trace mode;
a BWE register comprising a bit corresponding to each BWE signal, wherein a state of a bit of the BWE register controls a corresponding BWE signal;
a BWE sequence module that, while the BWEC signal is in the state trace mode,
sets each BWE signal to the block write enable state when the plurality of memory blocks are reset;
changes a first BWE signal from the block write enable state to the block write disable state after data is written to each memory block of the plurality of memory blocks, the data written to each memory block comprising the same data;
changes a second BWE signal from the block write enable state to the block write disable state in sequence after additional data is written to each memory block of the plurality of memory blocks with a BWE signal in the block write enable state, the additional data written to each memory block comprising the same additional data; and continues to change BWE signals from the block write enable state to the block write disable state in sequence after each set of additional data is written to each memory block of the plurality of memory blocks with a BWE signal in the block write enable state until the BWE signals are all in the block write disable state, the additional data written to each memory block comprising the same additional data, wherein data written to a memory block is preserved after the BWE signal to the memory block changes to the block write disable state and wherein the memory blocks represent a data state sequence.

19. The apparatus of claim 18, further comprising a BWE register comprising a bit corresponding to each BWE signal, wherein a state of a bit of the BWE register controls a corresponding BWE signal.

20. The apparatus of claim 18, wherein the one or more address lines of the plurality of memory blocks comprise a subset of a set address lines to the plurality of memory blocks, the set of address lines addressing memory locations in the plurality of memory blocks, the subset of address lines corresponding to highest order bits of the set of address lines, the subset of address lines sufficient to select a memory block of the plurality of memory blocks.

21. The apparatus of claim 18, further comprising a normal use module that sets the BWEC signal to the normal use mode wherein the MUXs connect the address decoder to the write enable inputs of the plurality of memory blocks, the normal use module enabling the plurality of memory blocks to be used for general purpose data storage.

22. An apparatus comprising:
a memory module comprising a plurality of memory blocks;

an address decoder module that decodes one or more address lines of the plurality of memory blocks, wherein an address output of the address decoder module corresponds to each memory block of the plurality of memory blocks;

a BWE module comprising a block write enable ("BWE") signal corresponding to each memory block of the plurality of memory blocks, wherein each BWE signal has a block write enable state and a block write disable state; and a MUX module that passes, to a write enable input of each memory block of the plurality of memory blocks, one of
a corresponding address output of the address decoder module in response to receiving a block write enable control ("BWEC") signal in a normal use mode; and
a corresponding BWE signal in response to receiving the BWEC signal in a state trace mode;

a BWE sequence module that changes each BWE signal in sequence from the block write enable state to the block write disable state such that a first state comprises each BWE signal in the block write enable state and a final state comprises each BWE signal in the block write disable state and each intermediate state transitions a single BWE signal from the block write enable state to the block write disable state; and a data update module that, in response to the BWEC signal being in the state trace mode, writes, during a write operation, data to each memory block that has a BWE signal in the block write enable state, and does not write the data to each memory block that has a BWE signal in the block write disable state, wherein the data update module writes additional data to each memory block that has a BWE signal in the block write enable state after each time that the BWE sequence module changes a BWE signal from the block write enable state to the block write disable state.

* * * * *